B. H. HUBBERT.
VAPOR EXTRACTOR FOR USE IN TREATING WHISKY BARRELS.
APPLICATION FILED JUNE 14, 1909.
950,449.
Patented Feb. 22, 1910.
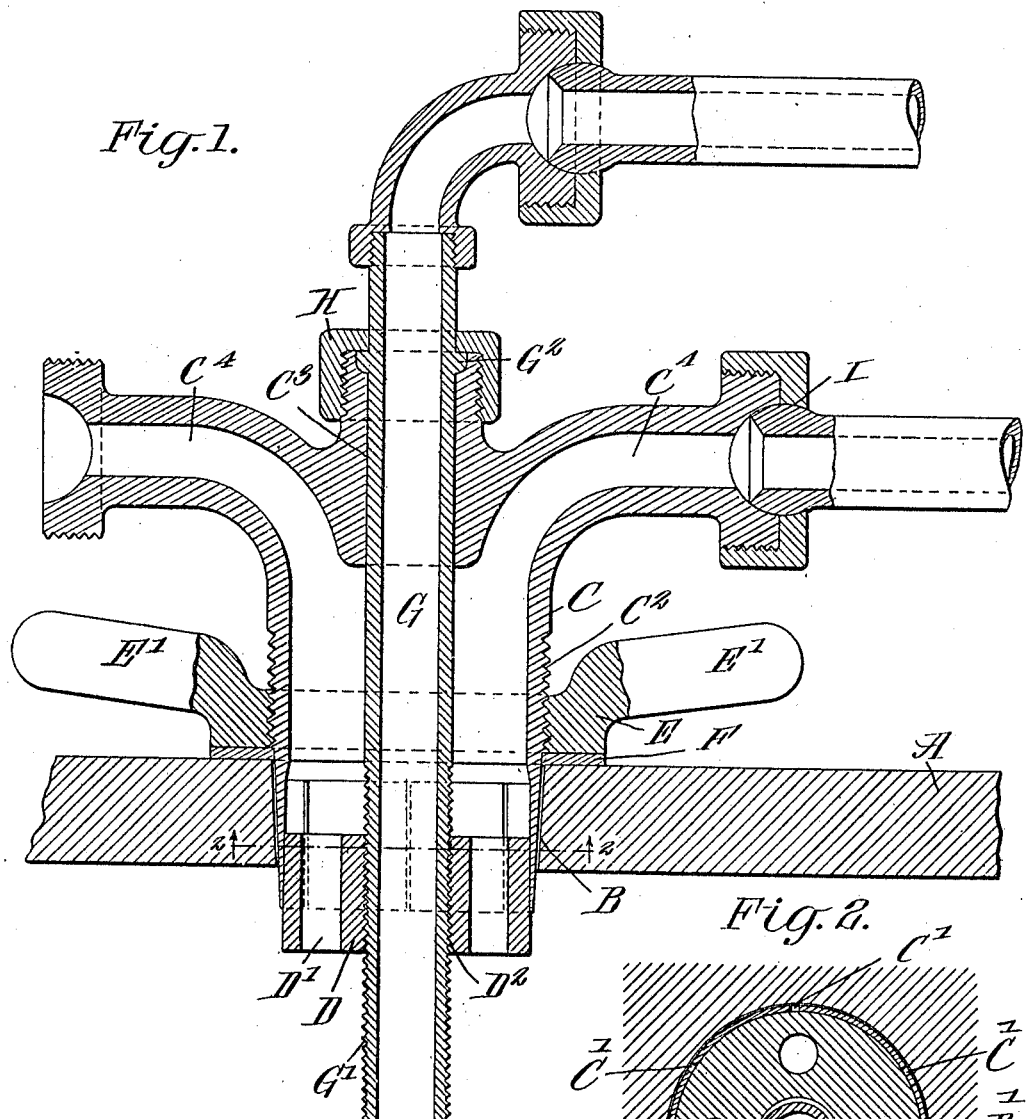
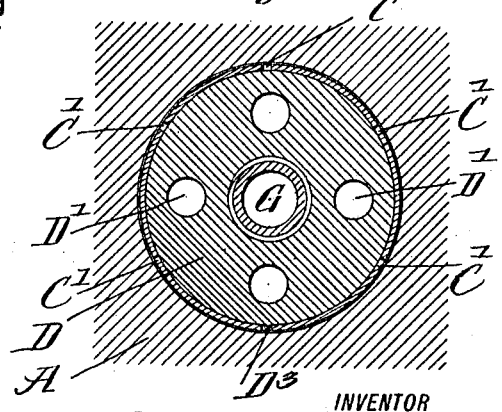
WITNESSES
INVENTOR
BERNHART H. HUBBERT
ATTORNEYS

UNITED STATES PATENT OFFICE.

BERNHART H. HUBBERT, OF HIGHLANDTOWN, MARYLAND.

VAPOR-EXTRACTOR FOR USE IN TREATING WHISKY-BARRELS.

950,449. Specification of Letters Patent. Patented Feb. 22, 1910.

Application filed June 14, 1909. Serial No. 502,035.

*To all whom it may concern:*

Be it known that I, BERNHART H. HUBBERT, a citizen of the United States, and a resident of Highlandtown, Baltimore county, State of Maryland, have made certain new and useful Improvements in Vapor-Extractors for Use in Treating Whisky-Barrels, of which the following is a specification.

This invention is a vapor extractor for use in treating whisky barrels; and the invention consists in certain novel constructions and combinations of parts as will be hereinafter described and claimed.

In the drawing Figure 1 is a section of my vapor extractor applied for use, and Fig. 2 is a detail cross section on about line 2—2 of Fig. 1.

In the drawing A designates a portion of the barrel, and B the bung hole therein in which is fitted the lower end of the cylindrical body C of the extractor. This body C is reduced in thickness at its lower end and is split from said end at C' so it may be expanded by the expander nut D, when the latter is drawn up into the split end of the body C, and on its outer side the body C is threaded at $C^2$ to receive the nut E, which may be threaded as presently described upon the body C and presses upon the gasket F, to form a tight joint between the body C and the barrel, and also to clamp the extractor firmly in position in connection with the operation of the expander nut D. The nut D may therefore, be called the expander nut, and the nut E the opposing nut, and this nut E may preferably be provided with a handle or handles E' to facilitate the convenient turning of the nut.

The expander nut D is ported at D' for the passage of the vapor from the barrel, and has a central threaded opening $D^2$ in which screws the lower threaded end G' of the inlet pipe G, which inlet pipe passes outwardly through an opening $C^3$ in the body C, and is provided with a flange $G^2$ retained by a cap H, so the inlet pipe G may be turned in, but will be held from any longitudinal movement in the body C when the parts are as shown in Fig. 1.

At its upper end the body C has an outlet or outlets $C^4$, for the vapor discharged from the barrel A, and pipe connections may be united by ball and socket joints at I with the outlet $C^4$ as shown in Fig. 1. One or more of the outlets $C^4$ may be employed at the same time and the others capped.

By turning the pipe G, which may be effected by means of pipe wrenches or other suitable means, the expander nut D may be moved into or out of the lower split end of the body C, and to prevent any turning of the nut D within the lower split end of the body C, said nut may be provided with one or more keys $D^3$ to operate in the slots C' of the body C, as best shown in Fig. 2 of the drawing. After the nut D has been drawn up into the split end of the body C, the opposing nut D, may be turned down on the body C to tighten the joint or connection between the body and the barrel as will be understood from Fig. 1 of the drawing.

In operation, steam or other medium may be introduced through the inlet pipe G to operate upon the interior of the barrel A, and then be discharged through the ports D' and the body C and outlet $C^4$ in the operation of the apparatus.

I claim—

1. The vapor extractor herein described comprising a body threaded on its outer side, and having its lower end adapted to expand within a bung hole, and provided in its top with a concentric opening for an inlet pipe, and a retaining cap above said opening, an inlet pipe threaded on its outer side at its lower end and fitting in said opening in the top of the body, and provided with a flange operating in the retaining cap, an expander nut within which the expander pipe screws, said nut fitting the lower end of the body portion and being ported for the passage of vapor, and an opposing nut screwing on the outer side of the body portion, the latter having an outlet, all substantially as and for the purpose set forth.

2. The combination with a vapor extractor, of a body portion having its lower end adapted to be expanded within a barrel bung hole, a nut operating in said lower end to expand the same, an inlet pipe screwing within said nut whereby to move the same into and out of the lower end of the body, and an opposing nut screwing on the body portion, substantially as set forth.

3. The combination in a vapor extractor, of a body portion having an outlet and having its lower end adapted to be expanded within a bung hole, an expander nut operating within said lower end of the body, means for operating said nut, and an opposing nut screwing on the outer side of the body, substantially as set forth.

4. The combination in a vapor extractor of a body portion having an outlet and having its lower end adapted to expand within a bung hole, an expander nut operating in said body portion, an inlet pipe threaded within the expander nut, and means to hold the inlet pipe from longitudinal movement in the body portion, said inlet pipe being rotatable within the body portion, substantially as set forth.

5. A vapor extractor comprising a body portion adapted at its lower end for connection with a barrel and having a lateral outlet, and also provided in its top with an opening for an inlet pipe, a pipe fitted removably in said top opening, and means for securing said inlet pipe.

BERNHART H. HUBBERT.

Witnesses:
CONRAD KNÖCHEL,
TOWNLEY R. WOLFE.